Oct. 9, 1934. W. H. NUTT 1,976,409
VEHICLE WHEEL SUSPENSION
Filed May 12, 1934 3 Sheets-Sheet 1
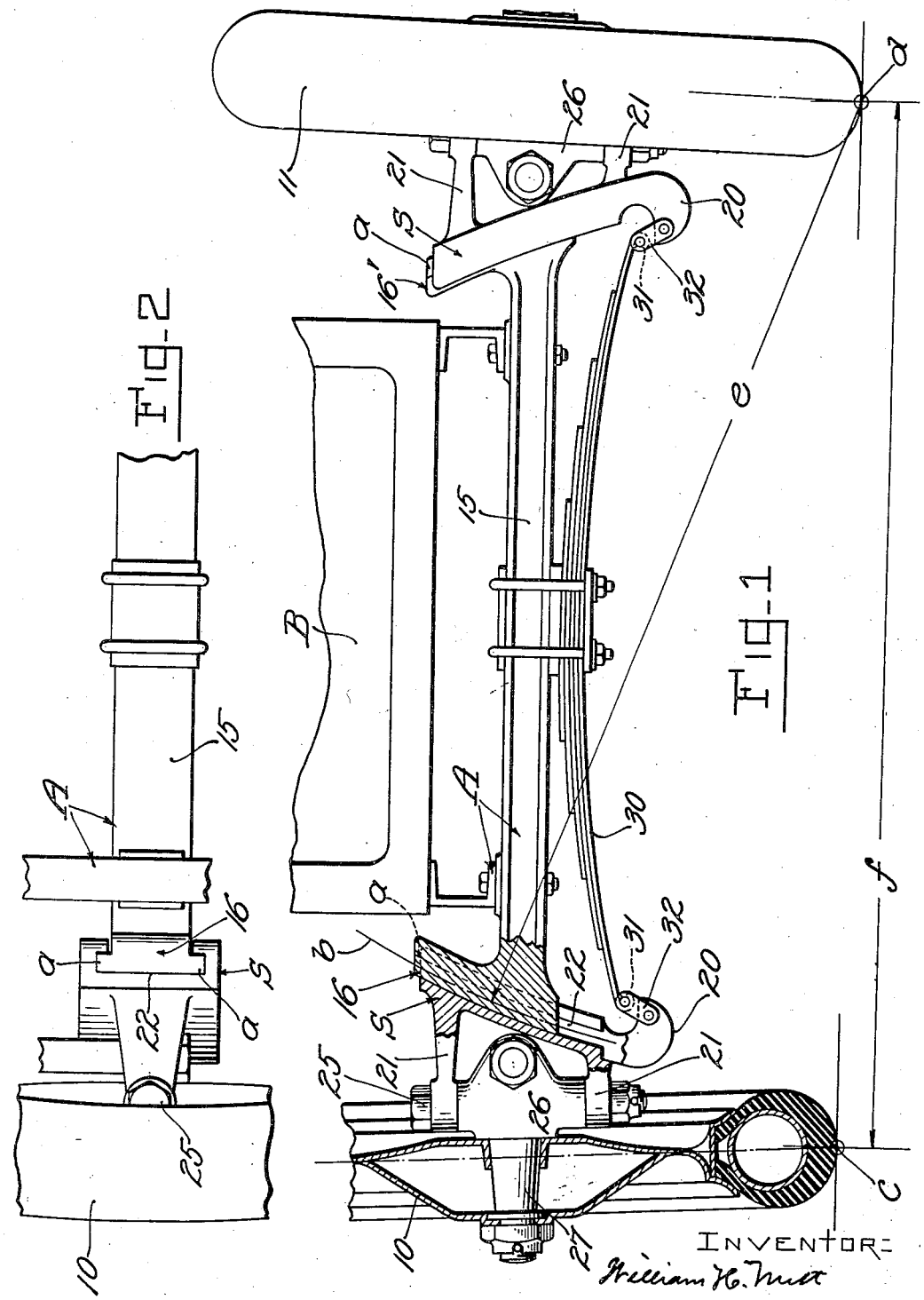
INVENTOR:
William H. Nutt
By Macleod, Calver, Copeland & Dike
Attys.

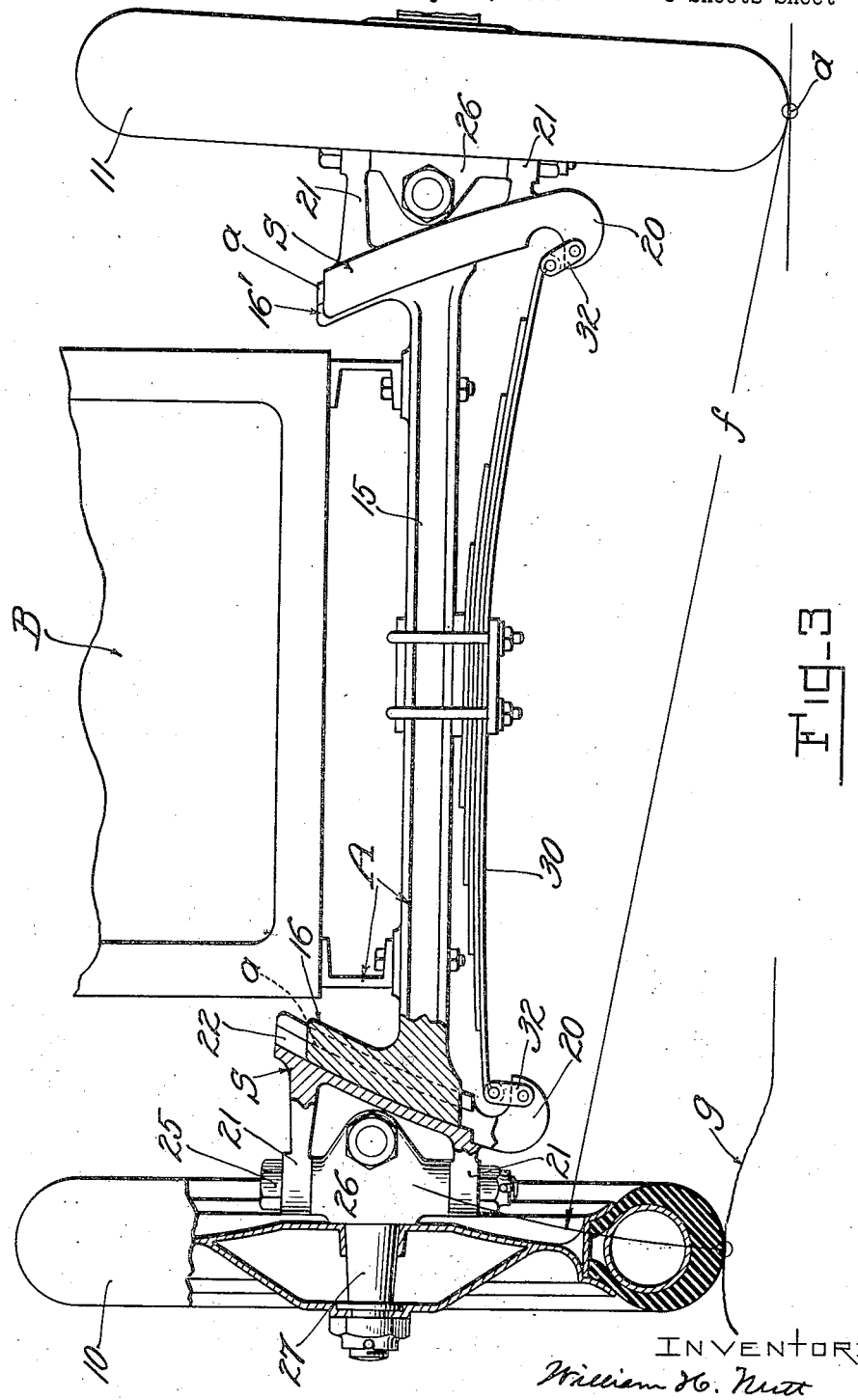

Oct. 9, 1934.  W. H. NUTT  1,976,409
VEHICLE WHEEL SUSPENSION
Filed May 12, 1934   3 Sheets-Sheet 3
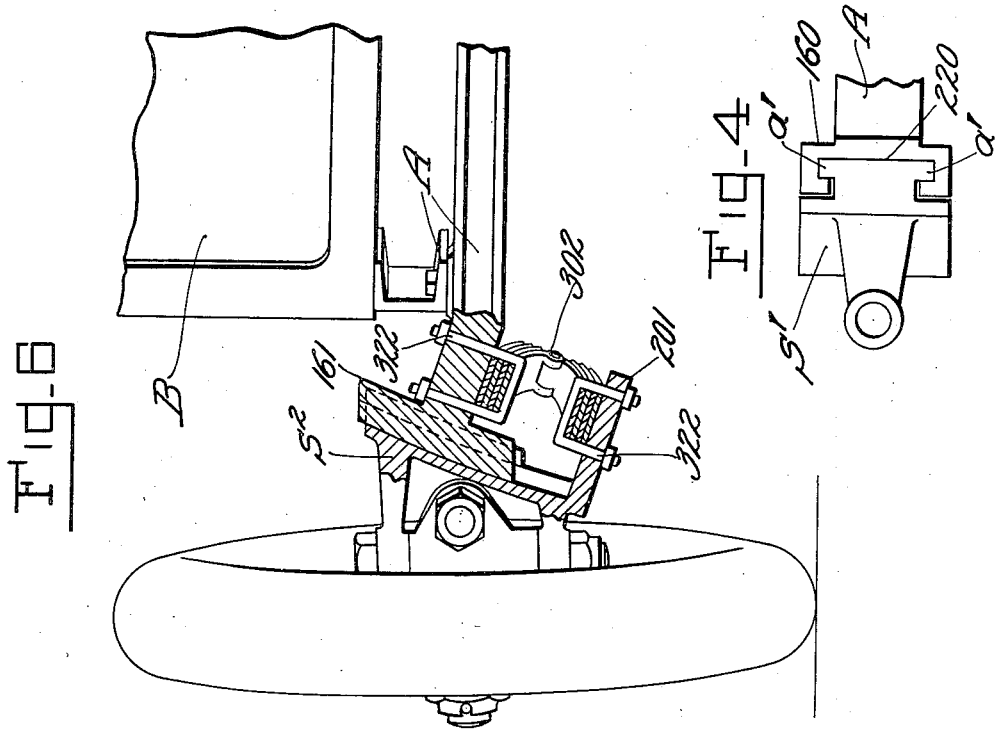
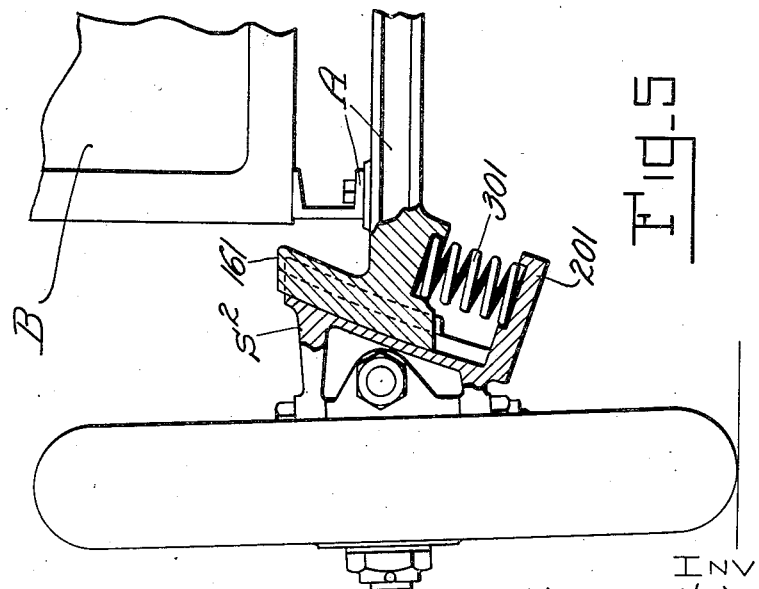
INVENTOR:
William H. Nutt
by Macleod Cahn Copeland
ATTYS.

Patented Oct. 9, 1934

1,976,409

UNITED STATES PATENT OFFICE 1,976,409

VEHICLE WHEEL SUSPENSION

William H. Nutt, Beverly, Mass.

Application May 12, 1934, Serial No. 725,299

4 Claims. (Cl. 267—19)

The invention relates to vehicle running gear, being more especially intended for the spring suspension of motor vehicles, but not necessarily so limited. The special object of the invention is to provide a connection between the chassis and each axle of oppositely disposed wheels so constructed that when either one of said wheels is displaced upwardly or downwardly it will move bodily in an arc of a circle whose center is at the tread of the opposite wheel at the particular instant when the displacement occurs.

As heretofore constructed, when one wheel is displaced by going over a hump the distance between the treads of the two opposed wheels is liable to vary for the time being and thus cause scuffing of the tires particularly when rounding curves in the roadway.

The special advantage of having independent axles connected with the chassis as stated is to cause the treads of the two opposite wheels to remain at the same distance apart when either is displaced.

In the drawings:

Fig. 1 is a view in elevation and partly in section of a spring suspension embodying the invention applied to the front end of a motor vehicle;

Fig. 2 is a fragmentary plan view of the chassis shown in Fig. 1;

Fig. 3 is a view similar to that of Fig. 1 but showing one of the wheels displaced.

Fig. 4 is a fragmentary view, corresponding to a portion of Fig. 2, illustrating a modification.

Fig. 5 is a view corresponding to the left end of Fig. 1 showing another modification.

Fig. 6 is a similar view, partly in perspective, showing a further modification.

The invention is herein illustrated as embodied in the front end suspension of a motor vehicle in which the chassis is shown at A and the vehicle body at B. At 10 and 11 are indicated respectively the right and left front wheels of the vehicle. Under normal conditions the tire of the wheel 10 contacts with the roadway at the point $c$ while the tire of the wheel 11 makes contact at the point $d$. At $f$ is indicated the tread span of the front wheels of the vehicle.

At 15 is indicated a transverse member which is secured to the vehicle chassis. This member may form a portion of the front axle of the vehicle or it may constitute the front cross member of the frame. The member 15 is provided at its ends with coupling members 16 and 16' each of which is formed with spaced guide flanges $a$ (see particularly Fig. 2). The flanges of the coupling member 16 are in the form of an arc $b$ as viewed in elevation (see Figs. 1 and 3) which is described about the contact point $d$ of the wheel 11 as a center with line $e$ as a radius, while the arc of the coupling member 16' is described about the contact point $c$ of the wheel 10 as a center.

Slidably mounted on each of the coupling members 16 and 16' is a coupling member S which comprises a body portion 20 having vertically spaced arms 21. The body portion 20 is provided with a T-shaped slot 22 (see particularly Fig. 2) which is in the form of the same arc as that of the coupling member 16 or 16' upon which it is mounted. Each coupling member S is adapted to slidably engage the guide flanges of its cooperating coupling member 16 or 16' with its arms 21 extending outwardly therefrom. Each coupling member S is thus capable of movement in a vertical plane.

Carried by the arms 21 of each coupling member S at the outer ends thereof, is the king pin 25 upon which is pivotally mounted the steering knuckle 26. Each steering knuckle 26 is provided with a stub axle 27 upon which one of the front wheels is mounted. Suspended from the transverse member 15 is a transverse leaf spring 30 having eyes 31 at either end thereof. The eyes 31 are connected by shackles 32 with the lower ends of the body portions 20 of the coupling members S.

It will thus be seen that each pair of cooperating coupling members constitutes a coupling which, through the cooperation of the spring 30, forms an automatically adjustable connection between its adjacent wheel and the chassis of the vehicle.

Whenever the wheel 10 is displaced, for instance by rolling over a hump in the roadway, as shown at $g$ in Fig. 3, the axle 27 with the steering knuckle 26 and coupling member S will be tilted in a vertical plane. By reason of the arcuate construction of the wheel couplings as previously described, the wheel 10 will be tilted in the arc of a circle whose center is at $d$ while the chassis A and body B of the vehicle remain on a level substantially parallel with the roadway. When thus tilted the left hand portion of the spring 30 will be partially or wholly straightened out as shown in Fig. 3, while the right hand portion of the spring will remain in its normal condition. After the wheel has returned to the level of the roadway the coupling member S associated with the coupling member 16 will move downward and finally come to its normal position as shown in Fig. 1.

If the wheel 11 is displaced either upwardly or downwardly while the wheel 10 is on the normal level the coupling associated with the wheel 11 will act in a manner similar to that described for the coupling of the wheel 10.

It will thus be evident that the tread span of the front wheels of the vehicle, represented by the letter *f* in Figs. 1 and 3, will remain constant irrespective of the displacement of either of said wheels.

It is obvious that, instead of providing the coupling members S with T-shaped slots and the coupling members 16 and 16' with guide flanges, the reverse construction might be employed. Thus, as shown in Fig. 4 the coupling member S' is provided with guide flanges *a'* slidably engaging a T-shaped slot 220 in the corresponding coupling member 160.

Also, instead of leaf springs 30, spiral, elliptic or other suitable forms of springs may be employed. Thus, for example, as shown in Fig. 5, the coupling member S2 is formed with a flange 201 between which and the corresponding member 161 is interposed a spiral spring 301. The construction shown in Fig. 6 is similar to that shown in Fig. 5 with the exception that, instead of the spiral spring, there is shown an elliptic spring 302 secured to the flange 201 and the coupling member 161 by U-shaped bolts or clamps 322.

I claim:

1. A vehicle having a pair of wheels on opposite sides of the vehicle body from each other, each wheel being mounted on an axle, and means to movably mount each wheel to have independent vertical movement, said means being so constructed and arranged that when either of said wheels rises or falls to a different level from the opposite wheel the immediate tread of the one that rises or falls will move in an arc of a circle whose center is at the immediate tread of the opposite wheel.

2. A vehicle having a pair of wheels on opposite sides of the vehicle body, each wheel being mounted on an axle, a coupling for each of said axles whereby it is connected to have independent vertical movement with a fixed member of the vehicle, said coupling and fixed member being so constructed and arranged that when either wheel rises or falls to a different level from that of the opposite wheel the immediate tread of the one that rises or falls will move in an arc of a circle whose center is at the immediate tread of said opposite wheel.

3. In a vehicle chassis having independent axles upon which oppositely disposed wheels are mounted, the combination therewith of a pair of couplings each of which constitutes an automatically adjustable connection between one of said wheels and said chassis, each coupling being so constructed and arranged that when one of said wheels is displaced either upwardly or downwardly the immediate tread of the one that rises or falls will move bodily in an arc of a circle whose center is at the immediate tread of the opposite wheel.

4. A vehicle having a pair of wheels on opposite sides of the vehicle body, each wheel being mounted on an axle, a coupling for each of said axles whereby it is connected to have independent vertical movement with a fixed member of the vehicle, said coupling and fixed member being formed with co-engaging curved faces one of which is convex and the other concave, each formed on the arc of a circle whose center is at the immediate tread of the opopsite wheel.

WILLIAM H. NUTT.